United States Patent [19]
Miller

[11] 3,825,250
[45] July 23, 1974

[54] MATERIAL EDGE ALIGNING DEVICE
[75] Inventor: Roy E. Miller, Mechanicsburgh, Pa.
[73] Assignee: Blue Bell, Inc., Greensboro, N.C.
[22] Filed: Dec. 28, 1971
[21] Appl. No.: 213,177

Related U.S. Application Data
[63] Continuation of Ser. No. 11,183, Feb. 13, 1970, abandoned.

[52] U.S. Cl................. 271/59, 112/DIG. 2, 270/58
[51] Int. Cl.............................................. B65h 9/04
[58] Field of Search .................. 271/59, 58, 49, 74; 226/15, 22; 270/12, 93, 58; 112/DIG. 2, DIG. 3, 136, 150

[56] References Cited
UNITED STATES PATENTS
2,127,292   8/1938   Gegenheimer.................. 271/59
2,368,098   1/1945   Belluche ........................ 271/59
3,204,591   9/1965   Pickett..................... 112/DIG. 2
3,252,437   5/1966   Pickett..................... 112/DIG. 2

Primary Examiner—Evon C. Blunk
Assistant Examiner—Bruce H. Stoner, Jr.

[57] ABSTRACT

The present apparatus is for guiding an edge of the marginal portion of material or the edges of a pair of superposed pieces of material being fed along guiding members so that the edges are given a desired direction and in the case of superposed pieces of material the edges are in alignment and adjustably supported pneumatic means moves the material against said guiding members during the feeding and guiding thereof.

17 Claims, 5 Drawing Figures

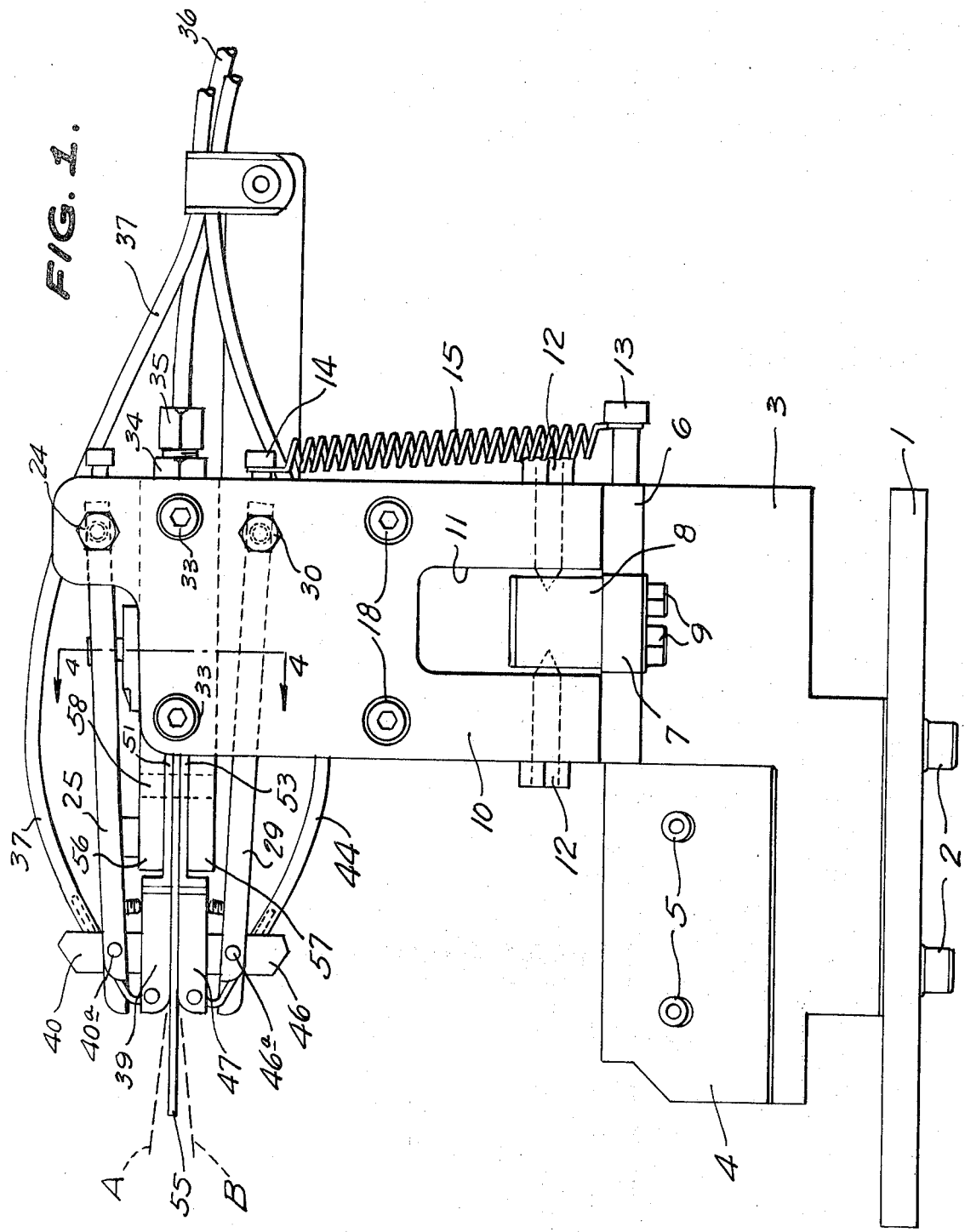

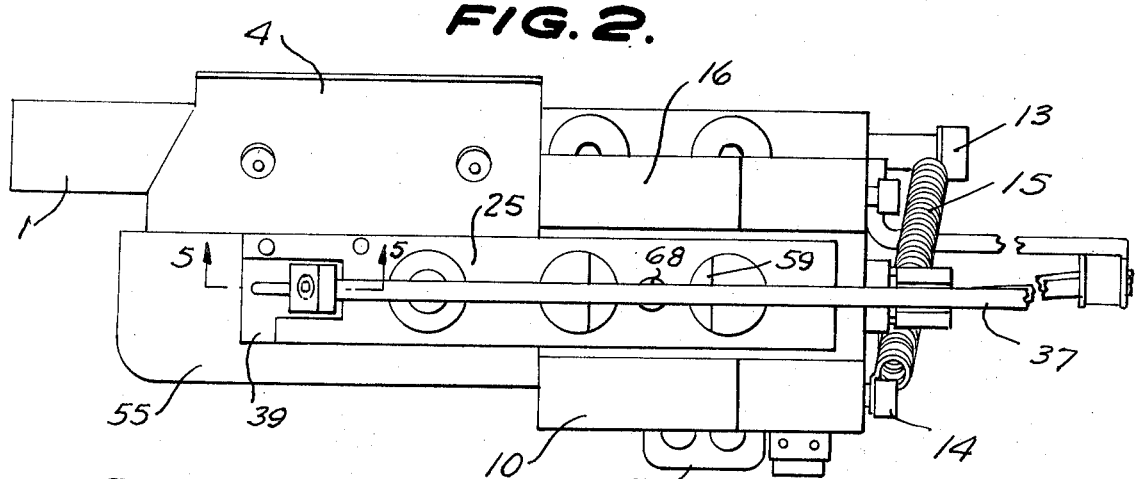
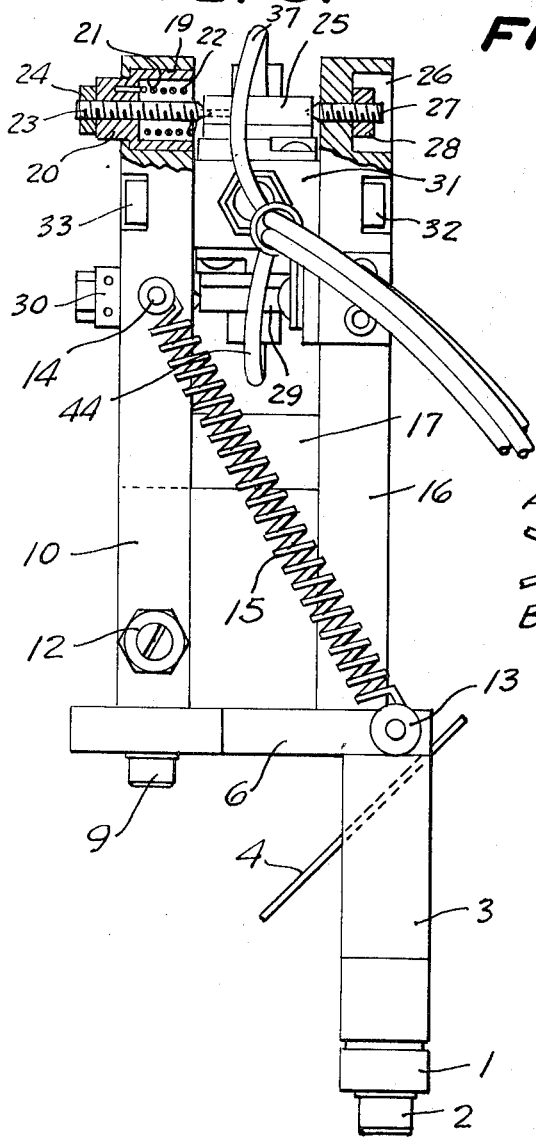
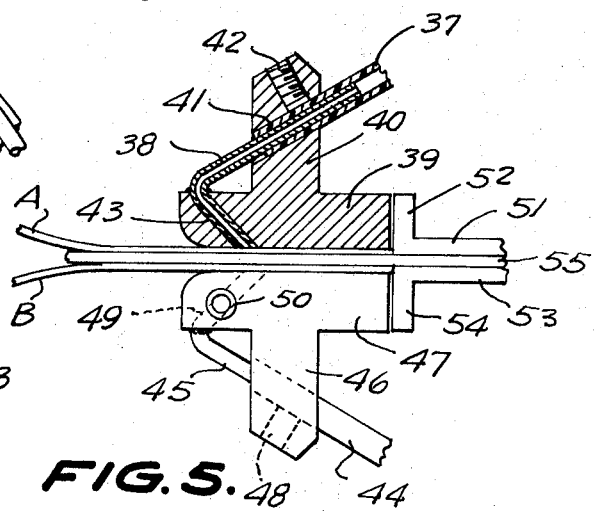

MATERIAL EDGE ALIGNING DEVICE

This is a continuation of application Ser. No. 11,183, filed on Feb. 13, 1970 and now abandoned.

The present apparatus is for guiding an edge of one or two pieces of material and aligning corresponding edges of superposed pieces of material being fed through the apparatus.

The principal object of the present invention is to provide apparatus for guiding an edge of one or two edges of superposed pieces of material being fed through the apparatus to direct the corresponding marginal portion of each piece of material in a desired direction and which apparatus can be used to align superposed edges of such material at the same time.

A further important object of the invention is to provide guiding means for material edges being fed thereby and having pneumatic means for moving the material laterally of its direction of feed to assist in the guiding of the material and which pneumatic means automatically adjust to the correct position depending on the thickness of the material being fed.

Another important object of the invention is to provide an apparatus for guiding material edges and which apparatus has a base which can be readily attached to other devices for performing work on the material while the guiding portion of the apparatus can pivot on said base to allow ready access to the work performing devices when desired.

Further objects of the present device will be in part obvious and in part pointed out in the following detailed description of the accompanying drawings, in which:

FIG. 1 is a front elevation of the present apparatus.

FIG. 2 is a top view of said apparatus.

FIG. 3 is a side elevation taken from the right hand side of FIG. 1 and with a top portion broken away to show interior details.

FIG. 4 is an enlarged cross-sectional view taken on line 4—4 of FIG. 1.

FIG. 5 is an enlarged view of the guiding members of the apparatus with the top foot being a section thereof taken on line 5—5 of FIG. 2.

Referring now more in detail to the accompanying drawings in which like and corresponding parts are designated by similar reference characters; 1 indicates a tie bar while 2 are bolts attaching said tie bar to the bottom of a base block 3. A waste plate 4 is attached by screws 5 to one side of the top of base block 3 while support plate 6 is fixedly attached, as by bolts, welding or the like, along one marginal portion to the remaining top of base block 3 and extends normal thereto and therefrom providing a shelf.

A hinge block 8 is attached to the outer narrow end 7 of support plate 6 by bolts 9.

A front plate 10 has a recess 11 open at the bottom of plate 10. Pointed end screws 12 are in threaded engagement with plate 10 and extend therethrough into recess 11 and into cone shaped recesses in the opposite sides of hinge block 8 whereby front plate 10 can pivot on screws 12 at their point of contact with hinge block 8. A shoulder screw 13 is in threaded engagement with support plate 6, while shoulder screw 14 is in threaded engagement with front plate 10. A coil spring 15 has its opposite ends encircling shoulder screws 13 and 14.

A back plate 16 has its bottom edge detachably seated on support plate 6. A spacer block 17 is positioned between plates 10 and 16 and screws 18 extend through plate 10 and block 17 and are in threaded engagement with back plate 16 retaining front plate 10, block 17 and back plate 16 together, but spacing front plate 10 and back plate apart.

Front plate 10 has a stepped bore 19 through its upper end portion in which is positioned a stepped sleeve 20 which has an inner recess 21. A coil spring 22 is in recess 21 and has an end fixedly connected in sleeve 20.

A pointed end screw 23 is in threaded engagement with sleeve 20 with a lock nut 24 on the outer end of screw 23.

Top leaf 25 has an end portion between front and back plates 10 and 16 with the pointed end of screw 23 extending into a cone shaped recess in one side of said leaf.

Back plate 16 has a stepped bore 26 in its upper end portion with pointed end screw 27 in theaded engagement with bore 26 and with its pointed end in a cone shaped recess in the other side of said leaf whereby screws 23 and 27 pivotally supports said leaf. A lock nut 28 is on screw 27.

The other end of coil spring 22 is fixedly attached to leaf 25 tending to move the free end of said leaf.

A bottom leaf 29 has one end pivotally and resiliently supported between said front and back plates in the same manner as that above described for leaf 25. Sleeve 30 corresponding to sleeve 20, extends through front plate 10 and contains a screw and coil spring (not shown) corresponding to screw 23 and spring 21, respectively, for supporting a side of leaf 29, while a screw (not shown) corresponding to screw 27, is in threaded engagement with back plate 16 for pivotally supporting the other side of leaf 29.

A bar 31 is positioned between leafs 25 and 29 and said front and back plates. Bolts 32 and 33 extend through said front and back plates and are in threaded engagement with bar 31 retaining the same together. A tube coupling 34 is in threaded engagement with bar 31 and male connector 35 is in threaded engagement with coupling 34 and attaches an end of tube 36 thereto. Tube 26 is attached to a source of air under pressure (not shown).

A hose 37 has a V-shaped tube 38 extending in one end of said hose, while the other end of said hose is connected to a source of air pressure (not shown). A foot 39 has an upright 40 with bore 41 extending through said upright and tube 37 extending through bore 41. A set screw 42 is in threaded engagement with upright 40 and bears against hose 37 retaining the end of hose 31 in said upright. Foot 39 has a bore 43 extending on a slant to the bottom of said foot and a length of V-shaped tube 38 extends therein. The free end of leaf 25 has a recess with upright 40 extending therethrough and set screw 40a is in threaded engagement with leaf 25 and bears against upright 40 pivotally retaining the same together.

A second hose 44 connected at one end to a source of air under pressure (not shown), has V-shaped tube 45 with one leg thereof inserted in the other end of hose 44. An upright 46 of a second shoe 47 has said other end of hose 44 extending on a slant therethrough, while screw 46a is in threaded engagement with leaf 29 and bears against upright 46 pivotally retaining the same together. Set screw 48 is in threaded engagement with upright 46 and bears against hose 44 retaining the same in upright 46.

Shoe 47 has a bore 49 through which extends the other leg of tube 45, while set screw 50 is in threaded engagement with shoe 47 and bears against the leg of tube 45 therein for retaining the same in shoe 47.

An L-shaped guide 51 has its base leg 52 alongside the inner end of shoe 39, while a second L-shaped guide 53 has its base leg 54 alongside the inner end of shoe 47.

A tongue 55 extends between shoes 39 and 47 and guides 51 and 53 are mounted on the opposite faces of said tongue. Bar 31 has a longitudinal slot in the left end portion of said bar as seen in FIG. 1 providing legs 56 and 57 between which extend tongue 55 and guides 51 and 53, while screw 58 extends through legs 56 and 57, guides 51 and 53 and tongue 55 and is in threaded engagement with bar 31 retaining said elements together.

A cap 59 is mounted on top of bar 31, while said bar has a cylindrical bore 60 therein below said cap with a pair of opposed pistons 61 and 61a slideably positioned in bore 60. "O" rings 62 and 63 are mounted in the periphery of said pistons as piston rings. Piston 61 has a top recess 64 in which is positioned coil spring 65 seated in cap 59 recess 66. A rod piston 67 is in threaded engagement with cap 59 and slideably extends through piston 61. A screw 68 is in threaded engagement with leaf 25 and bears against the outer end of rod piston 67.

Piston 61a has a top recess 69 in which is positioned coil spring 70. A second cap 70a is mounted on the opposite side of bar 31 over cylinder bore 60 and has an inner recess 71 in which is seated spring 70. A rod piston 72 is in threaded engagement with cap 70a and slideably extends through cylinder 61a. A screw 73 is in threaded engagement with leaf 29 and bears against rod piston 72.

Pistons 61 and 61a have recesses in their opposing faces providing space 74 therebetween in which extend the abutting ends of rod pistons 67 and 72.

In the use of the present apparatus air can be admitted to either or both of hoses 37 and 44. Thus if a piece of material A is fed across and between tongue 55 and shoe 39 and air is admitted to hose 37, the air from tube 38 will push material A laterally with the right hand edge of material A slideably touching guide leg 52 so that said material edge is guided thereby as the material is fed from the bottom portion to the top portion of tongue 55 as viewed in FIG. 2.

Similarly if a piece of material B is fed between tongue 55 and shoe 47, air can be fed through hose 44 and thus tube 45 whereby the right hand edge of said material B as viewed in FIG. 5 will slideably touch guide leg 54 and be guided thereby.

If materials A and B are fed at the same time in the manner above described their right hand edges as viewed in FIG. 5 will be in alignment as legs 52 and 54 are in alignment one above the other.

Springs 22 are arranged so as to tend to hold leafs 51 and 53 so that shoes 39 and 47 are against tongue 55 while the air from tubes 38 and 45 will assist in spacing said shoes from said tongue for the passage of materials A and B therebetween.

Air under pressure can also be fed to hose 36 through coupling 34 into bar 31 and the passage (not shown) bar 31 to space 74 of FIG. 4 raising rod pistons 67 and 72 and thus moving leafs 25 and 29. The amount of air to hose 36 will thereby control the spacing of shoes 39 and 47 from tongue 55 to accommodate materials A and B of different thicknesses.

When the apparatus is not being used for guiding material, front plate 10 can be pulled to the left of FIG. 3 against spring 15 whereby said front plate will pivot on screws 12 and carry back plate 16 and attached elements therewith. Releasing front plate 10 will enable spring 15 to return the front and back plates to their upright position as shown in the drawings.

The term "material" as used herein is meant to include any material of a weight which can be moved by the air from tubes 43 and 45 such as, for example only, fabric, paper and the like.

As an example of the use of the present apparatus, support plate 6 can be attached to a sewing machine or support therefore (not shown) by any conventional means with tongue 55 level with the throat of the sewing machine and guide legs 52 and 54 positioned for guiding the materials A and/or B to the sewing needle of the sewing machine whereby the material can be sewn as desired. Other material can equally as well be fed to other apparatus. For example, to means for the heat sealing of the edges or other work thereon.

We claim:

1. An apparatus for guiding material comprising a tongue, at least one guide extending upright relative to said tongue, at least one shoe pivotally positioned above said tongue adjacent said guide, means for urging said shoe away from said tongue for controlling the positioning of said shoe relative to said tongue depending upon the thickness of the material being guided, and means for guiding air under pressure from said shoe towards said tongue and said guide whereby material on said tongue will be continuously engaged by said pivotable shoe and will have an edge thereof touching said guide.

2. An apparatus for guiding material as claimed in claim 1 including at least one plate and a leaf pivotably connecting said shoe to said plate.

3. An apparatus for guiding material as claimed in claim 2 including a support for supporting said plate upright thereon, means pivotably connecting said plate to said support and resilient means tending to retain said plate upright on said support.

4. An apparatus for guiding material as claimed in claim 2 including resilient means tending to retain said shoe against said tongue.

5. An apparatus for guiding material as claimed in claim 4 including a second plate connected to said first plate, a pair of screws each in threaded engagement with one of said plates and pivotably engaging a side of said leaf and said resilient means includes a coil spring connected to one of said plates and said leaf.

6. An apparatus for guiding material as claimed in claim 2, said means for controlling the positioning of said shoe including a cylinder, and means for connecting said cylinder to a source of air under pressure for moving said piston outwardly of said cylinder against said leaf for pivoting said leaf.

7. An apparatus for guiding material as claimed in claim 2, said means for controlling the positioning of said shoe including a cylinder connected to said plate, a piston slidably extending into said cylinder, having a recess and a bore coaxial with said recess, a cap on said cylinder, a rod piston connected to said cap and slidably extending in said bore, resilient means in said recess and seated against said cap and means for connecting said cylinders to a source of air under pressure for raising said rod piston against said leaf to pivot said leaf.

8. An apparatus for guiding material as claimed in claim 6 including a bar connected to said plate, having said cylinder therein and a passage to said cylinder for feeding air thereto.

9. An apparatus for guiding material as claimed in claim 2 including a bar connected to said plate, having an end recess with a portion of said guide positioned in said recess and means connecting said guide to said bar.

10. An apparatus for guiding material as claimed in claim 1 wherein said shoe has a bore extending on a slant relative to said tongue and a hose connectable to a source of air under pressure, being connected to said bore.

11. An apparatus for guiding material as claimed in claim 1 wherein said shoe has an upright with a bore therethrough, said shoe has a bore extending on a slant relative to said tongue, a V-shaped tube extends through both bores and a hose connectable to a source of air under pressure is attached to said tube.

12. An apparatus for guiding material comprising at least one plate, a tongue connected to said plate, a pair of leafs pivotably connected to said plate and each extending along an opposite side of said tongue, a pair of shoes each connected to one of said leafs, a pair of guides positioned on an opposite side of said tongue, means for connecting each of said shoes to a source of air under pressure and means on each shoe for directing air on a slant toward said tongue.

13. An apparatus for guiding material as claimed in claim 12 including resilient means tending to retain said shoes toward said tongue.

14. An apparatus for guiding material as claimed in claim 12 including a cylinder connected to said plate, means for connecting said cylinder to a source of air under pressure, a pair of opposed pistons each slidably extending from said cylinder towards and against one of said leafs.

15. An apparatus for guiding material as claimed in claim 14 wherein each of said pistons has a piston with a recess and a bore, a rod piston slidably extending through said bore, a coil spring in said recess and a pair of caps are each mounted on one of said cylinders, has said spring seated therein and said rod piston connected thereto.

16. An apparatus for guiding material as claimed in claim 12 incuding a base, said plate being pivotably connected to said base, a second plate connected to, but spaced from said first plate and resilient means tending to hold said plates above said base.

17. A material edge guide apparatus comprising, means across which material may pass in a prescribed path of travel, means in juxtaposition to said first means limiting lateral displacement of the material, means limiting material displacement normal to the material path of travel in juxtaposition to said means across which the material passes, fluid means urging material edge portions adjacent said lateral limiting means, and fluid means for regulating the position of said normal displacement limiting means relative to said first named means.

* * * * *